US008490113B2

(12) United States Patent
Aho et al.

(10) Patent No.: US 8,490,113 B2
(45) Date of Patent: Jul. 16, 2013

(54) MESSAGING IN A PARALLEL COMPUTER USING REMOTE DIRECT MEMORY ACCESS ('RDMA')

(75) Inventors: Michael E. Aho, Rochester, MN (US); Thomas M. Gooding, Rochester, MN (US); Michael B. Mundy, Rochester, MN (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/167,911

(22) Filed: Jun. 24, 2011

(65) Prior Publication Data

US 2012/0331065 A1 Dec. 27, 2012

(51) Int. Cl.
*G06F 13/00* (2006.01)

(52) U.S. Cl.
USPC ............ 719/313; 719/328; 709/313; 709/328

(58) Field of Classification Search
USPC .......................... 719/313, 328; 709/212, 216
See application file for complete search history.

(56) References Cited

U.S. PATENT DOCUMENTS

| 5,481,721 | A  | * | 1/1996  | Serlet et al. ................... 719/315 |
|-----------|----|---|---------|------------------------------------------|
| 5,991,797 | A  | * | 11/1999 | Futral et al. ................... 709/216 |
| 7,581,232 | B2 | * | 8/2009  | Bernabeu-Auban et al. . 719/330          |
| 2006/0259489 | A1 | * | 11/2006 | Bernabeu-Auban et al. ..... 707/9     |
| 2010/0191909 | A1 | * | 7/2010  | Archer et al. ................. 711/118 |
| 2012/0011500 | A1 | * | 1/2012  | Faraboschi et al. ............... 718/1 |

* cited by examiner

*Primary Examiner* — Andy Ho
(74) *Attorney, Agent, or Firm* — Biggers & Ohanian, LLP

(57) ABSTRACT

Messaging in a parallel computer using remote direct memory access ('RDMA'), including: receiving a send work request; responsive to the send work request: translating a local virtual address on the first node from which data is to be transferred to a physical address on the first node from which data is to be transferred from; creating a local RDMA object that includes a counter set to the size of a messaging acknowledgment field; sending, from a messaging unit in the first node to a messaging unit in a second node, a message that includes a RDMA read operation request, the physical address of the local RDMA object, and the physical address on the first node from which data is to be transferred from; and receiving, by the first node responsive to the second node's execution of the RDMA read operation request, acknowledgment data in the local RDMA object.

12 Claims, 8 Drawing Sheets

MESSAGING IN A PARALLEL COMPUTER USING REMOTE DIRECT MEMORY ACCESS ('RDMA')

BACKGROUND OF THE INVENTION

1. Field of the Invention

The field of the invention is data processing, or, more specifically, methods, apparatus, and products for messaging in a parallel computer using remote direct memory access ('RDMA').

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In high-performance computing (HPC), high-speed communications adapters use remote data memory access (RDMA) operations to move data between the memory of a local computer and the memory of a remote computer. The high-speed adapters which perform these operations characteristically work under a software stack known as Open Fabrics Enterprise Distribution (OFED).

SUMMARY OF THE INVENTION

Messaging in a parallel computer using remote direct memory access ('RDMA'), the parallel computer including a plurality of nodes, each node including a messaging unit, including: receiving, by a kernel of the first node through an application programming interface ('API'), a send work request, the send work request including: a local virtual address on the first node from which data is to be transferred; and a specification of a size of data to be transferred from the first node to a second node, wherein the size of data to be transferred from the first node to a second node is larger than a messaging packet size for sending data from the first node to a second node; responsive to the send work request: translating, by the kernel of the first node, the local virtual address on the first node from which data is to be transferred to a physical address on the first node from which data is to be transferred from; creating, by the kernel of the first node, a local RDMA object that includes a counter set to the size of a messaging acknowledgment field; sending, from a messaging unit in the first node to a messaging unit in a second node, a message that includes a RDMA read operation request, the physical address of the local RDMA object, and the physical address on the first node from which data is to be transferred from; and receiving, by the first node responsive to the second node's execution of the RDMA read operation request, acknowledgment data in the local RDMA object.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
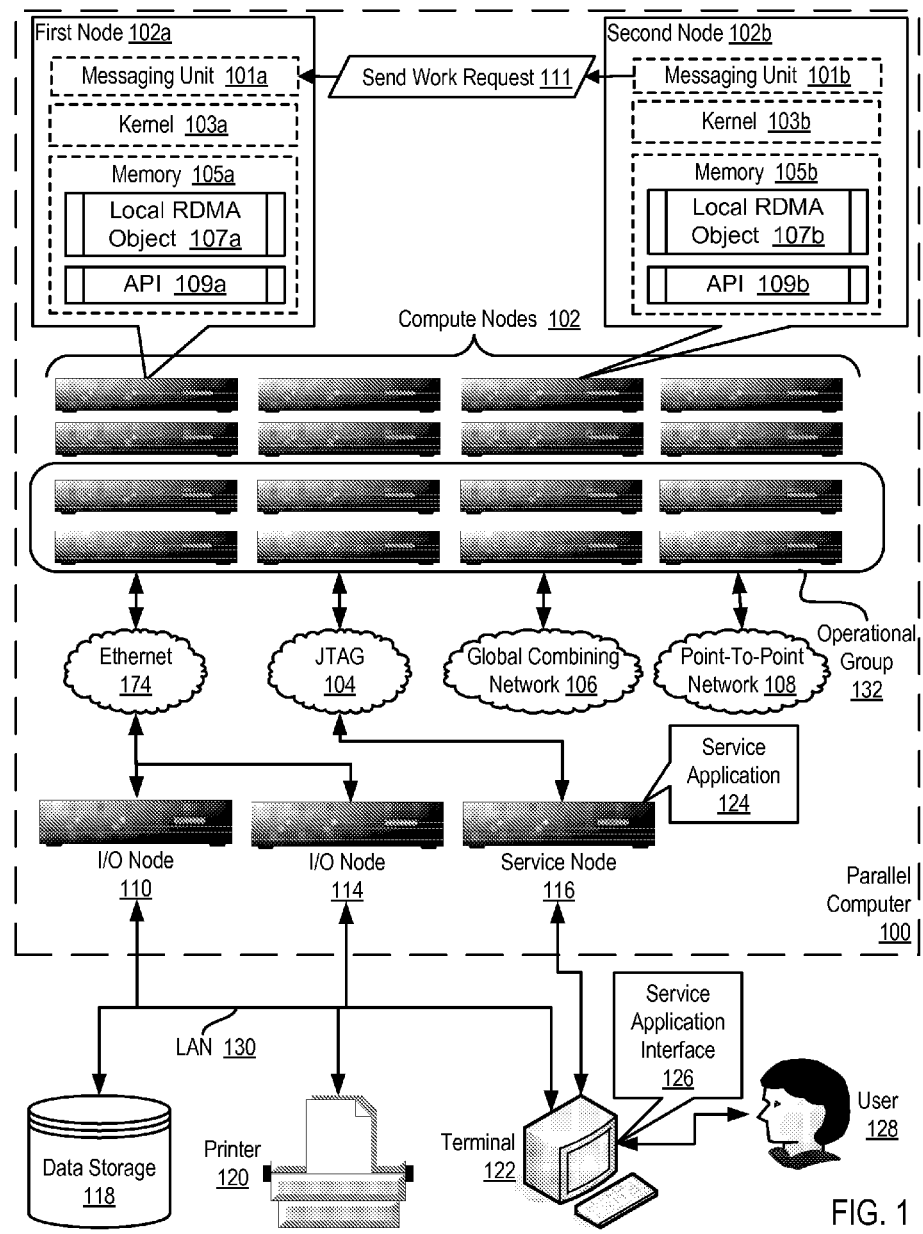
FIG. 1 sets forth example apparatus for messaging using RDMA according to embodiments of the present invention.

Exemplary methods, apparatus, and products for messaging in a parallel computer using RDMA in accordance with the present invention are described with reference to the accompanying drawings, beginning with FIG. 1. FIG. 1 sets forth example apparatus for messaging in a parallel computer using RDMA according to embodiments of the present invention. The apparatus of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for RDMA in a parallel computer according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 includes many nodes. In the example of FIG. 1, two nodes are illustrated in more detail, a first node (102a) and a second (102b). Each node (102a, 102b) includes a messaging unit (101a, 101b) for exchanging messages with other nodes, a kernel (103a, 103b) to provide operating system type services to the nodes (102a, 102b), and computer memory (105a, 105b). In the example of FIG. 1, the computer memory (105a, 105b) includes a local RDMA object (107a, 107b), which is a data structure useful in messaging in the parallel computer (100) using RDMA according to embodiments of the present invention. The computer memory (105a, 105b) also includes an API (109a, 109b), a module of computer program instructions, operations, and classes for initiating a send work request (111).

The parallel computer (100) of FIG. 1 operates generally for messaging in the parallel computer (100) using RDMA. The parallel computer (100) of FIG. 1 includes a plurality of nodes, such as the first node (102a) and the second node (102b), that may be embodied as a compute node, an I/O node, or other module of automated computing machinery that forms a parallel computer (100). In the example of FIG. 1, each node (102a, 102b) includes a messaging unit (101a, 101b). The messaging units (101a, 101b) of FIG. 1 may be embodied, for example, as a communications adapter for point-to-point data communications with other nodes in the parallel computer (100), as a library of data communications operations for carrying out data communications with other nodes in the parallel computer (100), or any combination thereof. In the example of FIG. 1, the messaging units (101a, 101b) may carry out data communications with other nodes in the parallel computer (100), for example, over a torus network as described with reference to FIGS. 1-4.

The parallel computer (100) of FIG. 1 carries out messaging using RDMA by receiving, by a kernel of the first node through an application programming interface ('API'), a send work request (111). The API (109a) of FIG. 1 may include one or more software routines that an application-level program can invoke to initiate a send work request (111). In the example of FIG. 1, a work request represents a request for the recipient of the work request to perform some task. The send work request (111) of FIG. 1 is a particular type of work request. The send work request (111) of FIG. 1 represents a request for the recipient of the send work request (111) to perform the task of sending data to another node. In the example of FIG. 1, the send work request (111) is received by the first node (102a), and as such, the send work request (111) represents a request for the first node (102a) to perform the task of sending data to another node, designated here as the second node (102b).

In the example of FIG. 1, the send work request includes a local virtual address on the first node from which data is to be transferred. The local virtual address points to a location in virtual memory of the first node (102a) that is mapped to actual physical memory of the first node (102a), for example, by a page table that is accessible by the kernel (103a). In the example method of FIG. 1, the send work request (111) also includes a specification of a size of data that is to be transferred from the first node (102a) to the second node (102b).

In the example method of FIG. 1, data can be transferred from the first node (102a) to the second node (102b) by exchanging messages between a messaging unit (101a) of the first node (102a) and a messaging unit (101b) of the second node (102b). Such messages may have a predefined packet size to include control information such as the address of the recipient, as well as a payload representing the actual data that is to be transferred. In the example of FIG. 1, the size of data to be transferred from the first node (102a) to the second node (102b) is larger than a messaging packet size for sending data from the first node (102a) to a second node (102b). Because the size of the data to be transferred from the first node (102a) to the second node (102b) is larger than the messaging packet size, transferring the data referenced in the send work request (111) by exchanging messages between the messaging unit (101a) of the first node (102a) and the messaging unit (101b) of the second node (102b) would necessitate exchanging multiple messages.

The parallel computer (100) of FIG. 1 further carries out messaging using RDMA by translating, by the kernel of the first node, the local virtual address on the first node from which data is to be transferred to a physical address on the first node from which data is to be transferred from. The physical address represents the physical address in memory from which data is to be transferred. In the example of FIG. 1, translating the local virtual address on the first node (102a) to a physical address on the first node (102a) may be carried out, for example, by looking up the virtual address in a page table stored on the first node (102a), by looking up the virtual address in a translation lookaside buffer ('TLB') stored on the first node, by using an address translation algorithm, and so on.

The parallel computer (100) of FIG. 1 further carries out messaging using RDMA by creating, by the kernel of the first node, a local RDMA object that includes a counter set to the size of a messaging acknowledgment field. In the example of FIG. 1, a messaging acknowledgment field represents a data structure used to store acknowledgement data that is sent in response to the receipt of a message. For example, if the first node (102a) sent a message to the second node (102b) using the messaging unit (101a) in the first node (102a), the first node (102a) would expect to receive acknowledgment data from the second node (102b) indicating that the message was received by the second node (102b). Such acknowledgment data may include information used to verify that the message was received correctly such as, for example, a checksum. In the example of FIG. 1, the acknowledgment data would be written into a messaging acknowledgment field in computer memory of the first node (102a). Because the local RDMA object (107a) includes a counter set to the size of a messaging acknowledgment field, as acknowledgment data is received by the first node (102a), the first node (102a) may decrement the counter for the purpose of determining when all acknowledgment data has been received. In the example of FIG. 1, the size of a messaging acknowledgment field may be expressed in any unit of measure, for example, such as byte, kilobyte, megabyte, and so on.

The parallel computer (100) of FIG. 1 further carries out messaging using RDMA by sending, from a messaging unit in the first node to a messaging unit in a second node, a message. In the example of FIG. 1, the message includes a RDMA read operation request, the physical address of the local RDMA object (107a), and the physical address on the first node (102a) from which data is to be transferred from. In the example of FIG. 1, a RDMA read operation request is sent from the first node (102a) to the second node (102b), to prompt the second node (102b) to read data stored in memory of the first node (102a) into memory on the second node (102b). In such an example, the RDMA read operation request is accompanied by the physical address on the first node (102a) from which data is to be transferred from, so that the second node (102b) is informed of the address in memory on the first node (102a) that the data is to be read from.

The parallel computer (100) of FIG. 1 further carries out messaging using RDMA by receiving, by the first node responsive to the second node's execution of the RDMA read operation request, acknowledgment data in the local RDMA object. In the example of FIG. 1, acknowledgment data is sent from the recipient of a message to the sender of a message in response to the receipt of a message. For example, if the first node (102a) sent a message to the second node (102b) using the messaging unit (101a) in the first node (102a), the first node (102a) would expect to receive acknowledgment data from the second node (102b) indicating that the message was received by the second node (102b). Such acknowledgment data may include information used to verify that the message was received correctly such as, for example, a checksum. In the example of FIG. 1, the acknowledgment data is written into a messaging acknowledgment field in the local RDMA object (107a) of the first node (102a).

The arrangement of nodes, networks, and I/O devices making up the example apparatus illustrated in FIG. 1 are for explanation only, not for limitation of the present invention. Apparatus capable of messaging using RDMA according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of RDMA in a parallel computer according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Messaging in a parallel computer using RDMA according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of messaging using RDMA according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Figure 2:
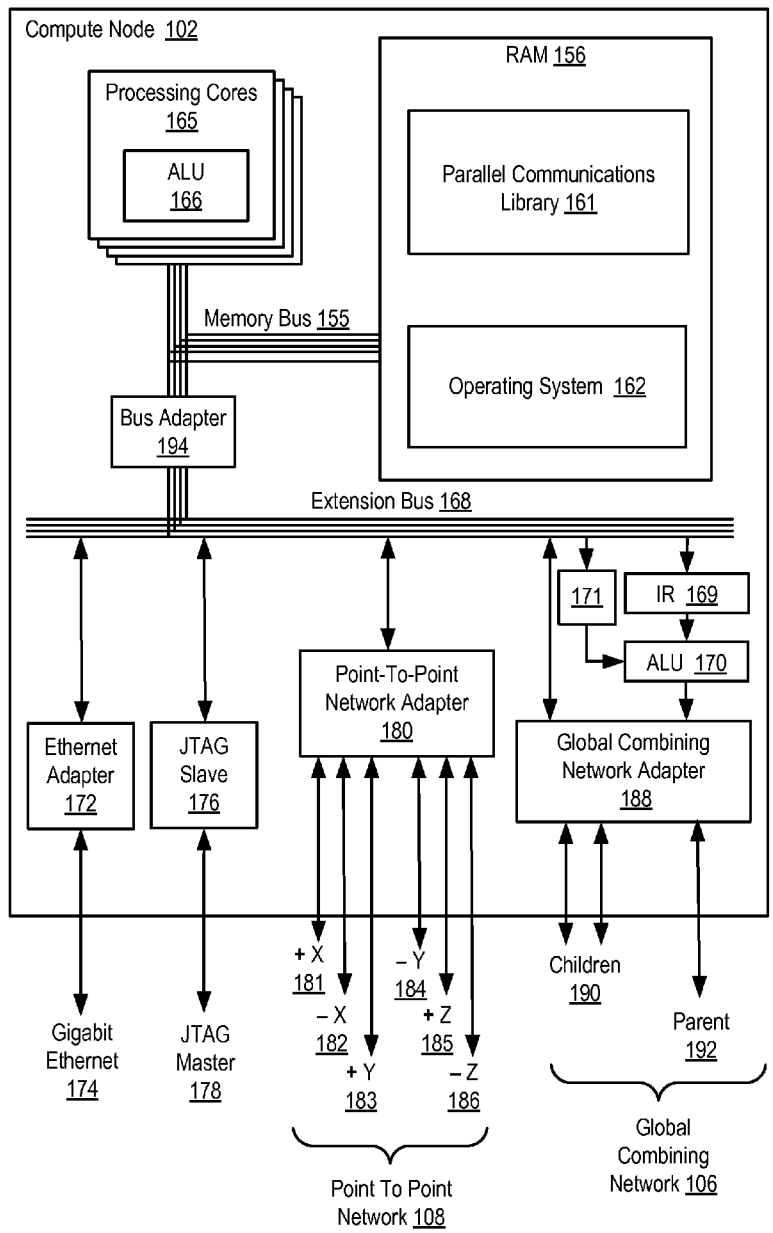
FIG. 2 sets forth a block diagram of an example compute node useful in a parallel computer capable of messaging using RDMA according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus for messaging using RDMA include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit).

Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for messaging using RDMA according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an all reduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

In the example of FIG. 2, the compute node (102) may utilize message unit ('MU') hardware for I/O data transport across I/O links and, for flexible I/O configurations, across an I/O torus. An I/O software architecture may specify a network layer on which I/O services are built. The network layer components may be modeled after the Open Fabrics RDMA framework or OpenFabrics Enterprise Distribution ('OFED') framework, an organization of companies and individuals providing open source software in the high-performance-computing ('HPC') arena. As such, internal network interfaces may be modeled after the OFED interfaces and processes running in the I/O node environment may communicate over I/O links using standard OFED RDMA verbs.

Figure 3A:
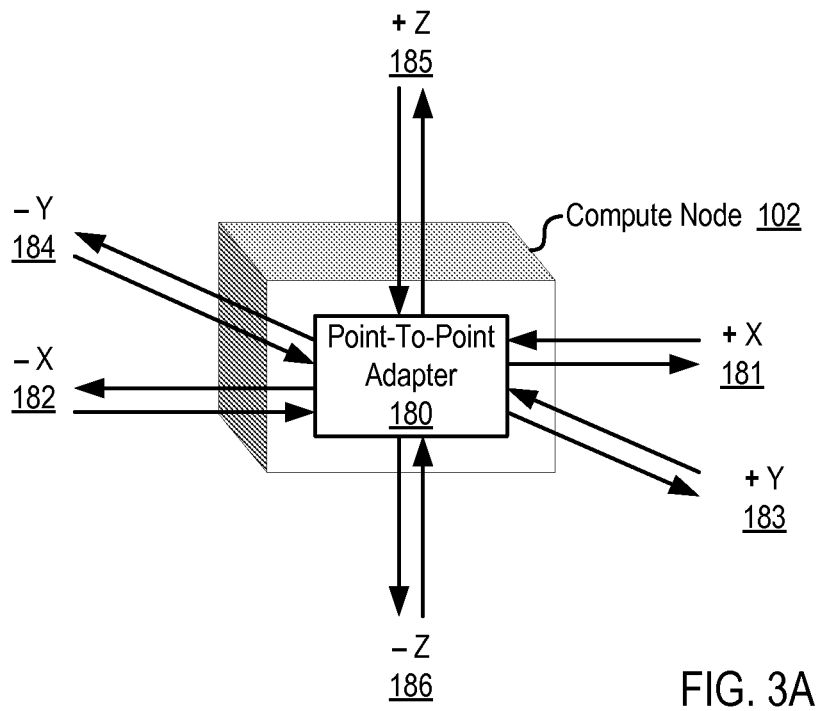
FIG. 3A sets forth a block diagram of an example Point-To-Point Adapter useful in systems for messaging using RDMA in a parallel computer according to embodiments of the present invention.

For further explanation, FIG. 3A sets forth a block diagram of an example Point-To-Point Adapter (180) useful in systems for messaging using RDMA according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
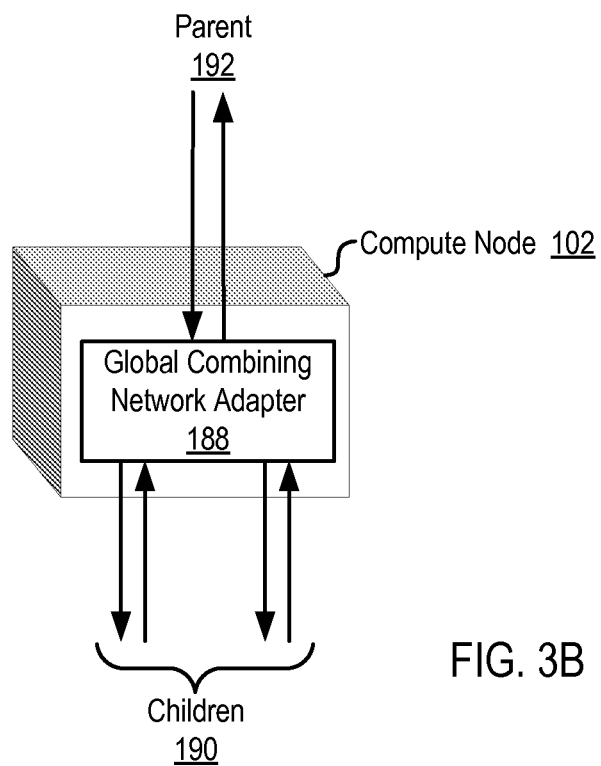
FIG. 3B sets forth a block diagram of an example Global Combining Network Adapter useful in systems for messaging using RDMA in a parallel computer according to embodiments of the present invention.

For further explanation, FIG. 3B sets forth a block diagram of an example Global Combining Network Adapter (188) useful in systems for messaging using RDMA according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
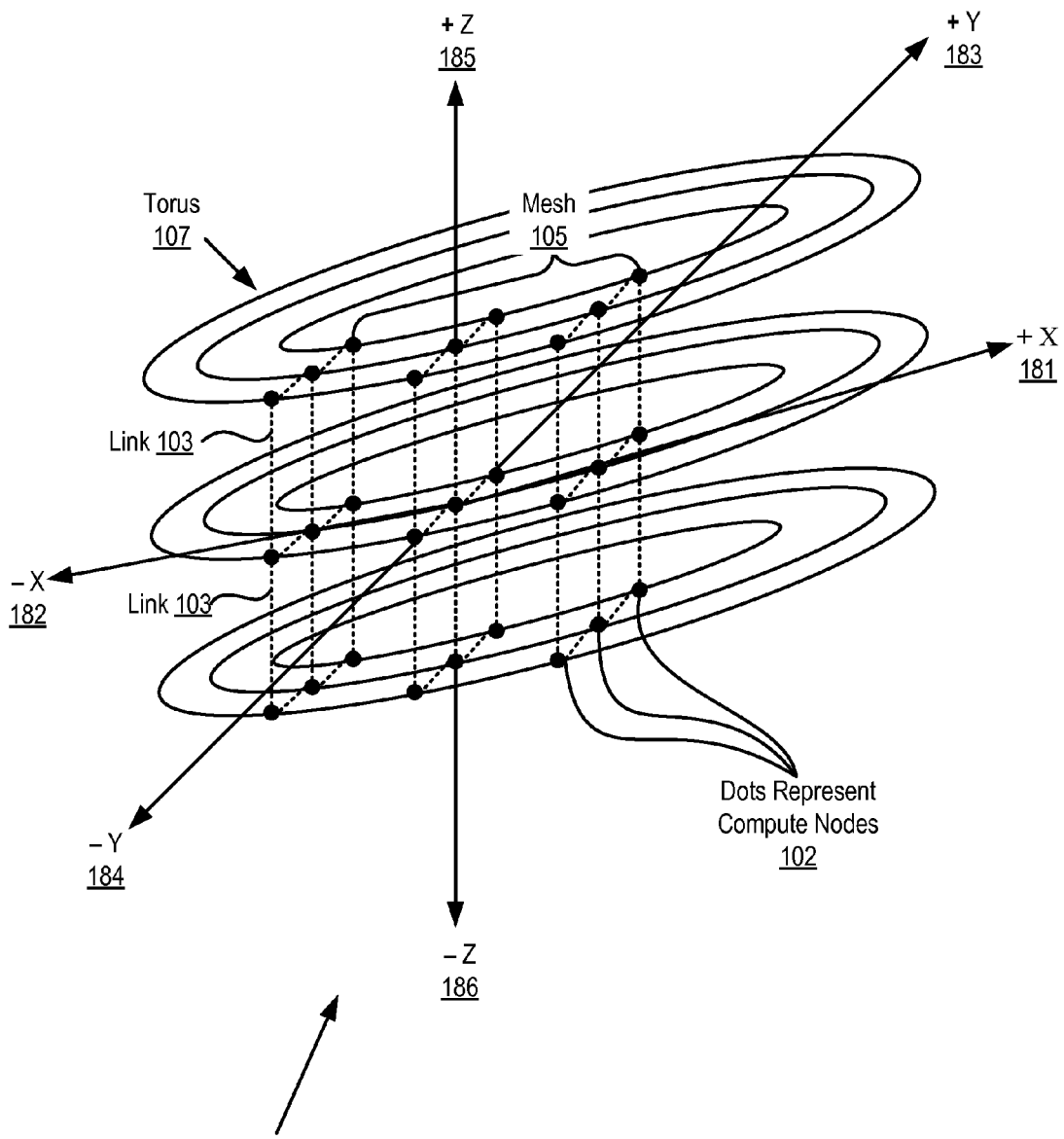
FIG. 4 sets forth a line drawing illustrating an example data communications network optimized for point-to-point operations useful in systems capable of messaging using RDMA in a parallel computer according to embodiments of the present invention.

For further explanation, FIG. 4 sets forth a line drawing illustrating an example data communications network (108) optimized for point-to-point operations useful in systems capable of messaging using RDMA according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in messaging in a parallel computer using RDMA in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in messaging in a parallel computer using RDMA in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
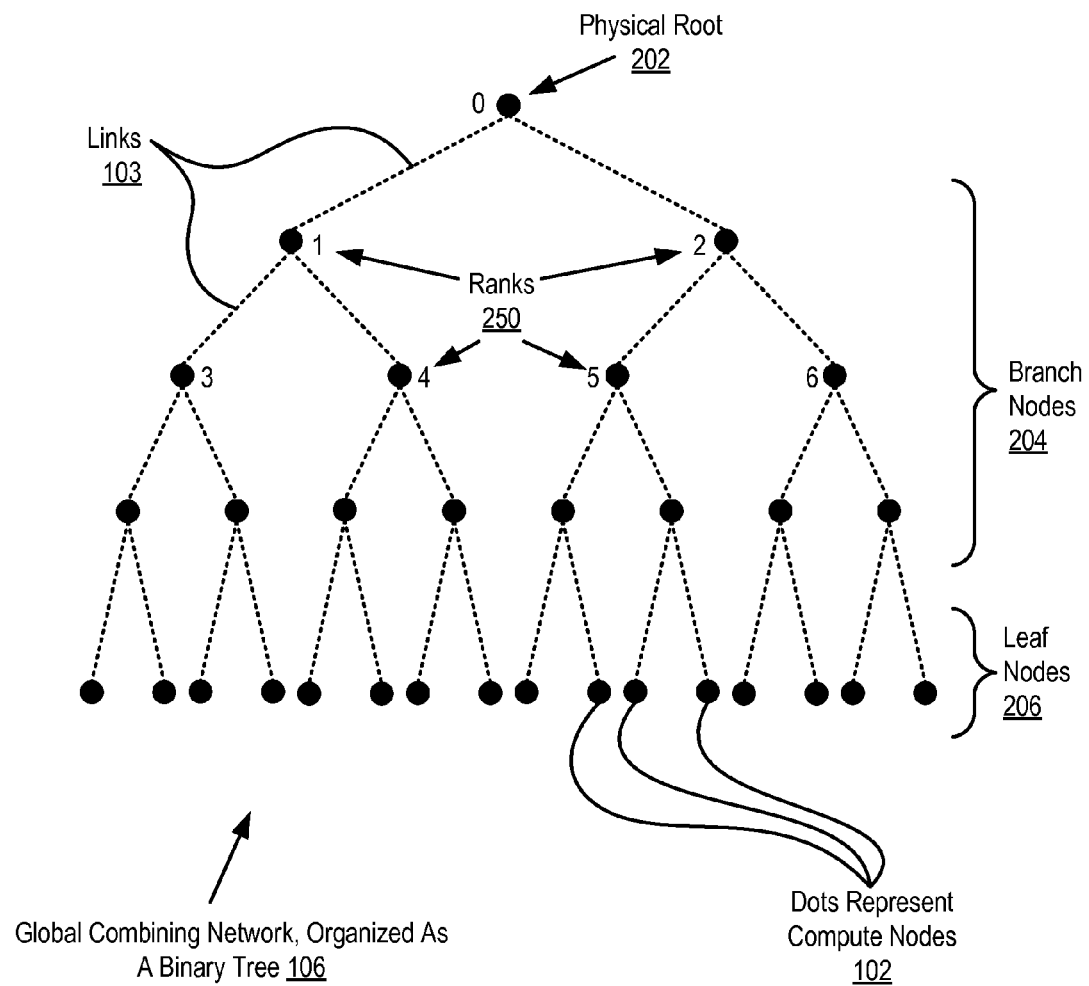
FIG. 5 sets forth a line drawing illustrating an example global combining network useful in systems capable of messaging using RDMA in a parallel computer according to embodiments of the present invention.

For further explanation, FIG. 5 sets forth a line drawing illustrating an example global combining network (106) useful in systems capable of messaging using RDMA according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in RDMA in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
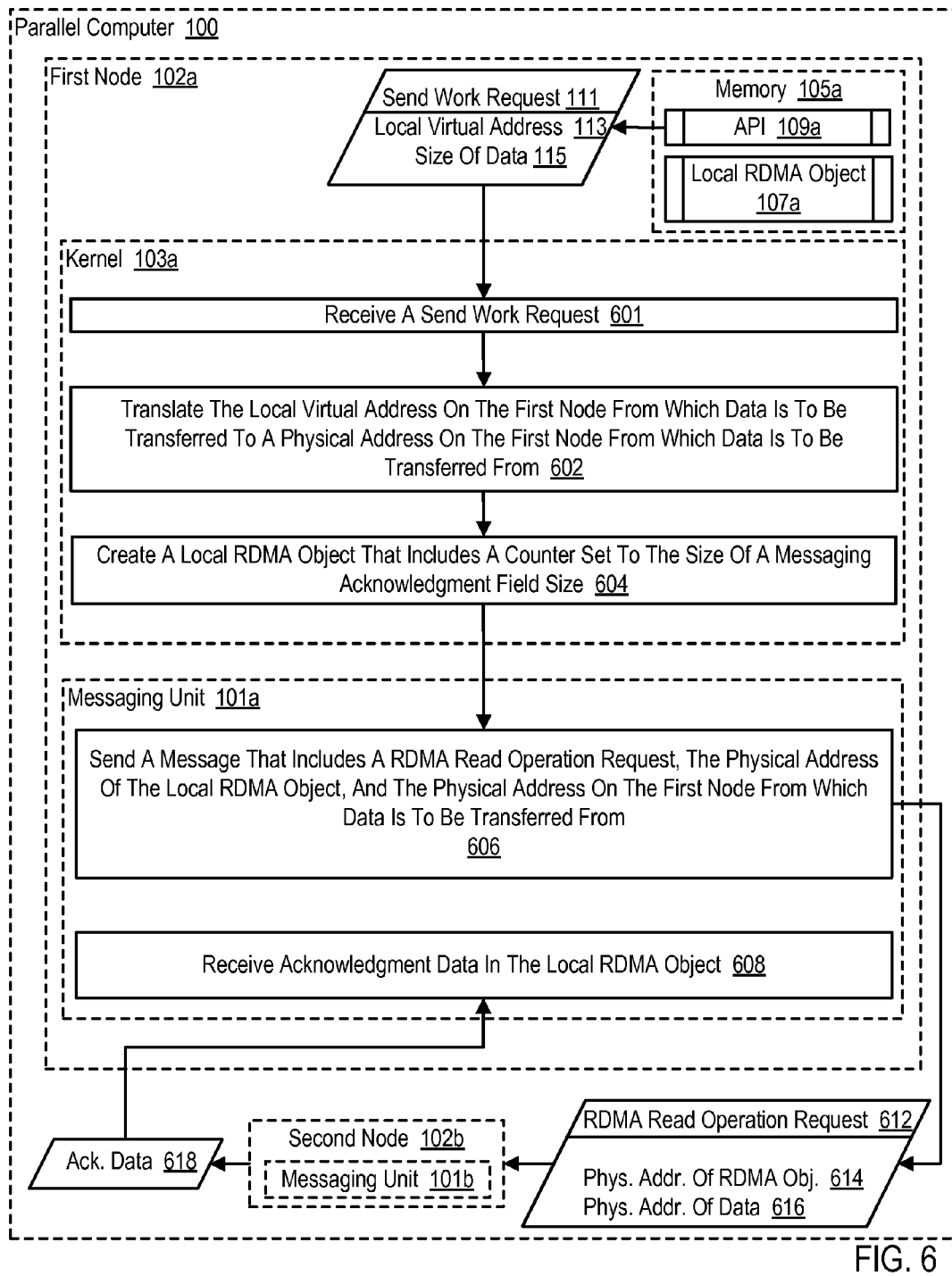
FIG. 6 sets forth a flow chart illustrating an example method for messaging in a parallel computer using RDMA according to embodiments of the present invention.

For further explanation, FIG. 6 sets forth a flow chart illustrating an example method for messaging in a parallel computer (100) using RDMA according to embodiments of the present invention. The parallel computer (100) of FIG. 6 includes a plurality of nodes (102a, 102b). In the example of FIG. 6, each node (102a, 102b) may be embodied, for example, as a compute node, an I/O node, or other module of automated computing machinery that forms a parallel computer (100).

In the example of FIG. 6, each node (102a, 102b) includes a messaging unit (101a, 101b). The messaging units (101a, 101b) of FIG. 6 may be embodied, for example, as a communications adapter for point-to-point data communications with other nodes in the parallel computer (100), as a library of data communications operations for carrying out data communications with other nodes in the parallel computer (100), or any combination thereof. In the example of FIG. 6, the messaging units (101a, 101b) may carry out data communications with other nodes in the parallel computer (100), for example, over a torus network as described above with reference to FIGS. 1-4.

The example method of FIG. 6 includes receiving (601), by a kernel (103a) of the first node (102a) through an API (109a), a send work request (111). The API (109a) of FIG. 6 may include one or more software routines that an application-level program can invoke to initiate a send work request (111). In the example of FIG. 6, a work request represents a request for the recipient of the work request to perform some task. The send work request (111) of FIG. 6 is a particular type of work request. The send work request (111) of FIG. 6 represents a request for the recipient of the send work request (111) to perform the task of sending data to another node. In the example of FIG. 6, the send work request (111) is received (601) by the first node (102a), and as such, the send work request (111) represents a request for the first node (102a) to perform the task of sending data to another node, designated here as the second node (102b).

In the example method of FIG. 6, the send work request (111) includes a local virtual address (113) on the first node (102a) from which data is to be transferred. The local virtual address (113) of FIG. 6 points to a location in virtual memory of the first node (102a) that is mapped to actual physical memory of the first node (102a), for example, by a page table that is accessible by the kernel (103a). In the example method of FIG. 6, the send work request (111) also includes a specification of a size (115) of data that is to be transferred from the first node (102a) to the second node (102b).

In the example method of FIG. 6, data can be transferred from the first node (102a) to the second node (102b) by exchanging messages between a messaging unit (101a) of the first node (102a) and a messaging unit (101b) of the second node (102b). Such messages may have a predefined packet size to include control information such as the address of the recipient, as well as a payload representing the actual data that is to be transferred. In the example of FIG. 6, the size (115) of data to be transferred from the first node (102a) to the second node (102b) is larger than a messaging packet size for sending data from the first node (102a) to a second node (102b). Because the size (115) of the data to be transferred from the first node (102a) to the second node (102b) is larger than the messaging packet size, transferring the data referenced in the send work request (111) by exchanging messages between the messaging unit (101a) of the first node (102a) and the messaging unit (101b) of the second node (102b) would necessitate exchanging multiple messages.

The example method of FIG. 6 also includes translating (602) the local virtual address (113) on the first node (102a) to a physical address on the first node (102a). The physical address represents the physical address in memory from which data is to be transferred. In the example of FIG. 6, translating (602) the local virtual address (113) on the first node (102a) to a physical address on the first node (102a) may be carried out, for example, by looking up the virtual address (113) in a page table stored on the first node (102a), by looking up the virtual address (113) in a TLB stored on the first node (102a), by using an address translation algorithm, and so on.

The example method of FIG. 6 also includes creating (604), by the kernel (103a) of the first node (102a), a local RDMA object (107a) that includes a counter set to the size of a messaging acknowledgment field. In the example of FIG. 6, a messaging acknowledgment field represents a data structure used to store acknowledgement data that is sent in response to the receipt of a message. For example, if the first node (102a) sent a message to the second node (102b) using the messaging unit (101a) in the first node (102a), the first node (102a) would expect to receive acknowledgment data from the second node (102b) indicating that the message was received by the second node (102b). Such acknowledgment data may include information used to verify that the message was received correctly such as, for example, a checksum. In the example of FIG. 6, the acknowledgment data would be written into a messaging acknowledgment field in computer memory of the first node (102a). Because the local RDMA object (107a) includes a counter set to the size of a messaging acknowledgment field, as acknowledgment data is received by the first node (102a), the first node (102a) may decrement the counter for the purpose of determining when all acknowledgment data has been received. In the example of FIG. 6, the size of a messaging acknowledgment field may be expressed in any unit of measure, for example, such as byte, kilobyte, megabyte, and so on.

The example method of FIG. 6 also includes sending (606) a message from a messaging unit (101a) in the first node (102a) to a messaging unit (101b) in the second node (102b). In the example of FIG. 6, the message includes a RDMA read operation request (612), the physical address (614) of the local RDMA object (107a), and the physical address (616) on the first node (102a) from which data is to be transferred from. In the example of FIG. 6, a RDMA read operation request (612) is sent from the first node (102a) to the second node (102b), to prompt the second node (102b) to read data stored in memory of the first node (102a) into memory on the second node (102b). In such an example, the RDMA read operation request (612) is accompanied by the physical address (616) on the first node (102a) from which data is to be transferred from, so that the second node (102b) is informed of the address in memory on the first node (102a) that the data is to be read from.

The example method of FIG. 6 also includes receiving (608), by the first node (102a) responsive to the second node's (102b) execution of the RDMA read operation request (612), acknowledgment data (618) in the local RDMA object (107a). In the example of FIG. 6, acknowledgment data (618) is sent from the recipient of a message to the sender of a message in response to the receipt of a message. For example, if the first node (102a) sent a message to the second node (102b) using the messaging unit (101a) in the first node (102a), the first node (102a) would expect to receive acknowledgment data (618) from the second node (102b) indicating that the message was received by the second node (102b). Such acknowledgment data (618) may include information used to verify that the message was received correctly such as, for example, a checksum. In the example of FIG. 6, the acknowledgment data (618) is written into a messaging acknowledgment field in the local RDMA object (107a) of the first node (102a).

Figure 7:
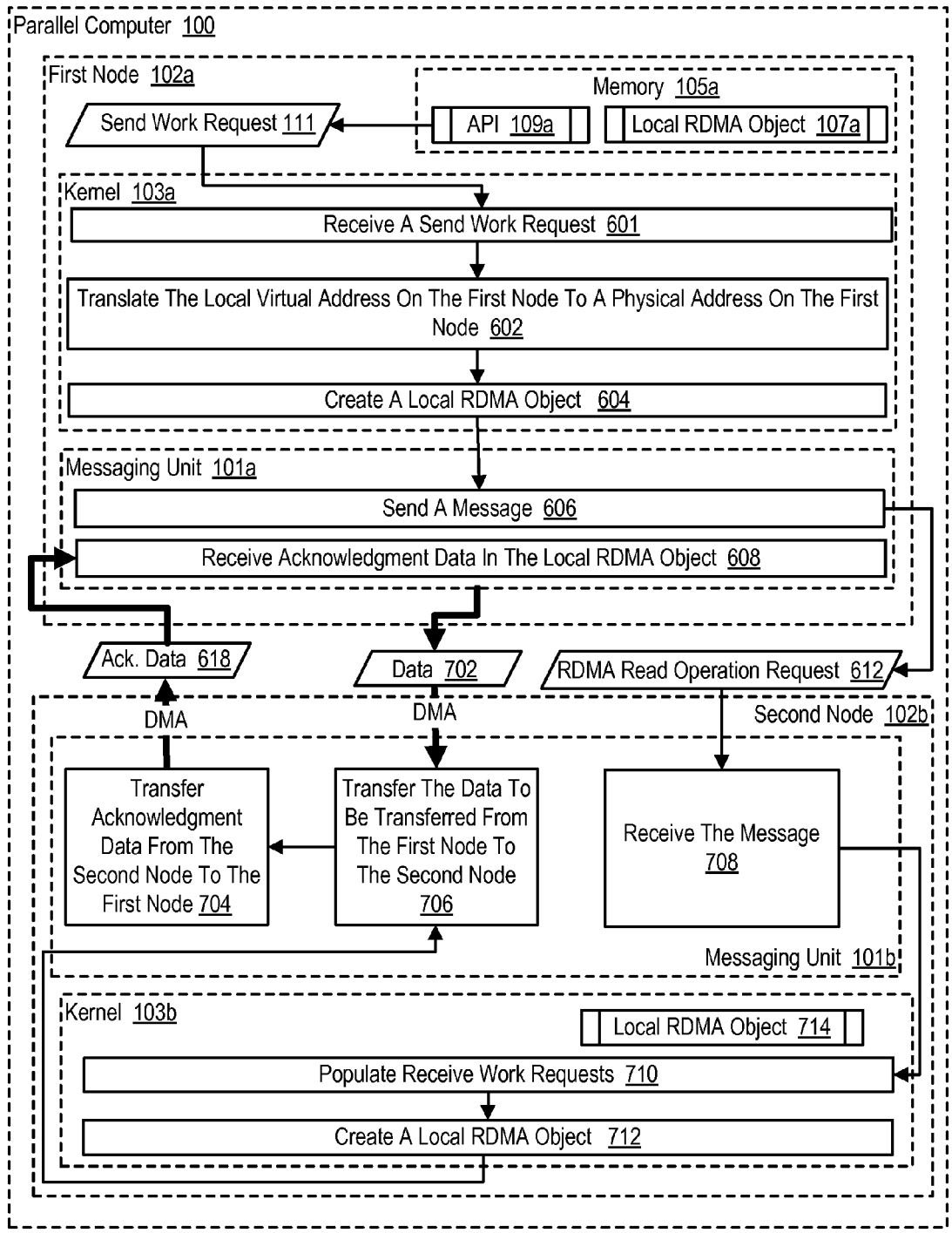
FIG. 7 sets forth a flow chart illustrating an example method for messaging in a parallel computer using RDMA according to embodiments of the present invention.

For further explanation, FIG. 7 sets forth a flow chart illustrating an example method for messaging in a parallel computer (100) using RDMA according to embodiments of the present invention. The example method of FIG. 7 is similar to the example method of FIG. 6 as it also includes:

receiving (601), by a kernel (103a) of the first node (102a) through an API (109a), a send work request (111) that includes a local virtual address on the first node from which data is to be transferred and a specification of a size of data to be transferred from the first node to a second node;

translating (602), by the kernel (103a) of the first node (102a), the local virtual address on the first node (102a) from which data is to be transferred to a physical address on the first node (102a) from which data is to be transferred from;

creating (604), by the kernel (103a) of the first node (102a), a local RDMA object (107a) that includes a counter set to the size of a messaging acknowledgment field;

sending (606), from a messaging unit (101a) in the first node (102a) to a messaging unit (101b) in a second node (102b), a message that includes a RDMA read operation request (612), the physical address of the local RDMA object, and the physical address on the first node from which data is to be transferred from; and receiving (608), by the first node (102a) responsive to the second node's (102b) execution of the RDMA read operation request (612), acknowledgment data (618) in the local RDMA object (107a).

The example method of FIG. 7 also includes populating (710), by a kernel (103b) on the second node (103a), receive work requests. In the example of FIG. 7, a work request represents a request for the recipient of the work request to perform some task. The receive work requests of FIG. 7 are a particular type of work request. The receive work requests of FIG. 7 represent a request for the recipient of the receive work requests to perform the task of receiving data from another node. In the example of FIG. 7, the receive work requests reside on the second node (102b), and as such, the receive work requests represent a request for the second node (102b) to perform the task of receiving data from another node, designated here as the first node (102a). In particular, the receive work requests represent a request for the second node (102b) to perform the task of receiving data that was sent from the first node (102a) to the second node (102b) in response to the send work request (111) carried out by the first node (102a). As such, the receive work requests can be populated (710) with information such as, for example, the size of data to be transferred from the first node (102a) to the second node (102b), an identification of the first node (102a) as the sender of the data to be received by the second node (102b), and so on, such that executing the populated receive work requests causes the second node (102b) to receive data that was sent from the first node (102a) to the second node (102b) in response to the send work request (111) carried out by the first node (102a).

The example method of FIG. 7 also includes receiving (708), by the messaging unit (101b) in the second node (102b), the message. In the example of FIG. 7, the second node (102b) can receive the message that includes a RDMA read operation request (612), the physical address of the local RDMA object, and other necessary information over a data communications network such as the torus network as described above with reference to FIG. 1-4.

The example method of FIG. 7 also includes creating (712), by the kernel (103b) of the second node (102b), a local RDMA object (714) that includes a counter set to the size of the amount of data to be transferred from the first node (102a) to the second node (102b). In the example of FIG. 7, the size of the amount of data to be transferred from the first node (102a) to the second node (102b) may be included, for example, in the RDMA read operation request (612). Because the local RDMA object (714) includes a counter set to the size of the amount of data to be transferred from the first node (102a) to the second node (102b), the second node (102b) may decrement the counter as data (702) is read from the first node (102a) for the purpose of determining when all data (702) has been received. In the example of FIG. 7, the size of the amount of data to be transferred from the first node (102a) to the second node (102b) may be expressed in any unit of measure, for example, such as byte, kilobyte, megabyte, and so on.

The example method of FIG. 7 also includes transferring (706), by one or more RDMA operations executing on the messaging unit (101b) in the second node (102b), the data (702) to be transferred from the first node (102a) to the second node (102b). In the example of FIG. 7, the one or more RDMA operations executing on the messaging unit (101b) in the second node (102b) may be embodied, for example, as computer program instructions executing on computer hardware, such as a processor, that transfer data between messaging units in nodes. In the example of FIG. 7, the RDMA operations executing on the messaging unit (101b) may include, for example, computer program instructions for retrieving data from memory on the first node (102a), encapsulating the data to be transferred, and transmitting the data (702) over a computer network. In the example of FIG. 7, the RDMA operations transfer data without using the central processing unit(s) of the nodes, such that the data transfers occur without creating heavy workload requirements for the central processing unit(s) of the nodes.

The example method of FIG. 7 also includes transferring (704), by one or more RDMA operations executing on the messaging unit (101b) in the second node (102b), acknowledgment data (618) from the second node (102b) to the first node (102a). In the example of FIG. 7, the RDMA operations executing on the messaging unit (101b) may include, for example, computer program instructions for retrieving acknowledgement data from memory on the second node (102b), encapsulating the acknowledgment data to be transferred, and transmitting the acknowledgment data (618) over a computer network.

In the example of FIG. 7, the send work request (111) is thereby carried out through the use of RDMA operations rather than through the use of messages that are exchanged between the messaging units (101a, 101b). That is, data is transferred from the first node (102a) to the second node (102b), as is requested in the send work request (111), by executing an RDMA read operation on the second node (102b) so as to directly read the data from memory in the first node (102a). Similarly, the transfer of data from the first node (102a) to the second node (102b) is acknowledged by the second node (102b) by executing an RDMA write operation on the second node (102a) so as to place acknowledgment data (618) in the computer memory of the first node (102a).

Figure 8:
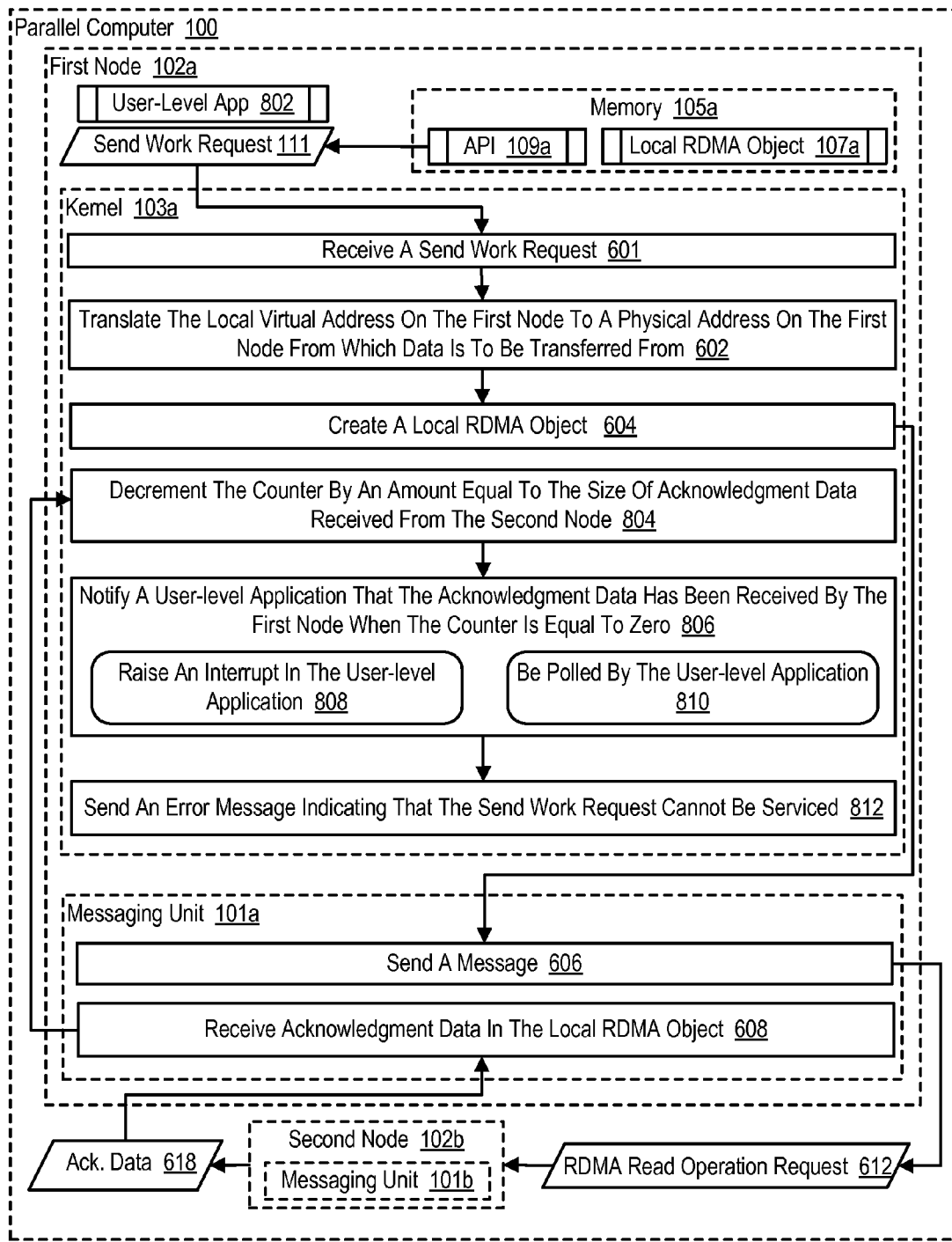
FIG. 8 sets forth a flow chart illustrating an example method for messaging in a parallel computer using RDMA according to embodiments of the present invention.

For further explanation, FIG. 8 sets forth a flow chart illustrating an example method for messaging in a parallel computer (100) using RDMA according to embodiments of the present invention. The example method of FIG. 8 is similar to the example method of FIG. 6 as it also includes:

receiving (601), by a kernel (103a) of the first node (102a) through an API (109a), a send work request (111) that includes a local virtual address on the first node from which data is to be transferred and a specification of a size of data to be transferred from the first node to a second node;

translating (602), by the kernel (103a) of the first node (102a), the local virtual address on the first node (102a) from which data is to be transferred to a physical address on the first node (102a) from which data is to be transferred from;

creating (604), by the kernel (103a) of the first node (102a), a local RDMA object (107a) that includes a counter set to the size of a messaging acknowledgment field;

sending (606), from a messaging unit (101a) in the first node (102a) to a messaging unit (101b) in a second node (102b), a message that includes a RDMA read operation request (612), the physical address of the local RDMA object, and the physical address on the first node from which data is to be transferred from; and receiving (608), by the first node (102a) responsive to the second node's (102b) execution of the RDMA read operation request (612), acknowledgment data (618) in the local RDMA object (107a).

The example method of FIG. 8 also includes decrementing (804), by the kernel (103a) on the first node (102a), the counter by an amount equal to the size of acknowledgment data received from the second node (102b). In the example of FIG. 8, the counter is set to the size of a messaging acknowledgment field. By decrementing (804) the counter by an amount equal to the size of acknowledgment data received from the second node (102b), the kernel (103a) can determine when all acknowledgment data has been received. That is, when the counter is equal to zero the kernel (103a) can determine that enough data to populate the entire messaging acknowledgment field has been received, thereby indicating that all of the acknowledgment data has been received from the second node (102b). Such acknowledgment data may subsequently be used to determine whether the message that included a RDMA read operation request (612) was received as expected.

The example method of FIG. 8 also includes notifying (806), by the kernel (103a) on the first node (102a), a user-level application (802) that the acknowledgment data has been received by the first node (102a) when the counter is equal to zero. When the counter is equal to zero the kernel (103a) can determine that enough data to populate the entire messaging acknowledgment field has been received, thereby indicating that all of the acknowledgment data has been received from the second node (102b). As such, the kernel (103a) may therefore notify (806) the user-level application (802) that all acknowledgment data has been received by the first node (102a), so that the user-level application (802) can analyze the acknowledgment data to verify that the message was received by the second node (102b), to determine that the message should be retransmitted, and so on.

In the example method of FIG. 8, notifying (806) a user-level application (802) that the acknowledgment data has been received by the first node (102a) when the counter is equal to zero includes raising (808) an interrupt in the user-level application (802). In the example of FIG. 8, raising (808) an interrupt in the user-level application (802) may be carried out by issuing an interrupt request (IRQ) indicating the need for attention by an interrupt handler. Raising (808) an interrupt in the user-level application (802) can cause a context switch to the interrupt handler that can signal, to the user-level application (802), that all acknowledgment data has been received by the first node (102a).

In the example method of FIG. 8, notifying (806) a user-level application (802) that the acknowledgment data has been received by the first node (102a) when the counter is equal to zero can alternatively include being (810) polled by the user-level application (802). In the example of FIG. 8, the user-level application (802) may include computer program instructions that enable the user-level application (802) to actively sample to the status of the send work request (111) and subsequent DMA read operation request, for example, by periodically checking the value of the counter in the local RDMA object (107a).

The example method of FIG. 8 also includes sending (812) an error message indicating that the send work request (111) cannot be serviced. In the example of FIG. 8, the send work request (111) may not be serviced, for example, due to a communications failure between the first node (102a) and the second node (102b), due to an error reading from memory in the first node (102a), due to an error writing to memory in the second node (102b), and so on. In response to determining that an error has occurred, an error message can be sent (812) to the user-level application (802) so that the user-level application (802) can retry the send work request (111) or simply proceed without executing the R send work request (111).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for messaging in a parallel computer using remote direct memory access ('RDMA'), the parallel computer including a plurality of nodes, each node including a messaging unit, the apparatus comprising a computer processor, a computer memory operatively coupled to the computer processor, the computer memory having disposed within it computer program instructions that, when executed by the processor, cause the apparatus to carry out the steps of:
   receiving, by a kernel of the first node through an application programming interface ('APF'), a send work request, the send work request including: a local virtual address on the first node from which data is to be transferred; and a specification of a size of data to be transferred from the first node to a second node, wherein the size of data to be transferred from the first node to a second node is larger than a messaging packet size for sending data from the first node to a second node;
   responsive to the send work request:
      translating, by the kernel of the first node, the local virtual address on the first node from which data is to be transferred to a physical address on the first node from which data is to be transferred from;
      creating, by the kernel of the first node, a local RDMA object that includes a counter set to the size of a messaging acknowledgment field;
      sending, from a messaging unit in the first node to a messaging unit in a second node, a message that includes a RDMA read operation request, the physical address of the local RDMA object, and the physical address on the first node from which data is to be transferred from; and
      receiving, by the first node responsive to the second node's execution of the RDMA read operation request, acknowledgment data in the local RDMA object.

2. The apparatus of claim 1 further comprising computer program instructions that, when executed by the processor, cause the apparatus to carry out the steps of:
   populating, by a kernel on the second node, receive work requests;
   receiving, by the messaging unit in the second node, the message;
   creating, by the kernel of the second node, a local RDMA object that includes a counter set to the size of the amount of data to be transferred from the first node to the second node;
   transferring, by one or more RDMA operations executing on the messaging unit in the second node, the data to be transferred from the first node to the second node; and
   transferring, by one or more RDMA operations executing on the messaging unit in the second node, acknowledgment data from the second node to the first node.

3. The apparatus of claim 1 further comprising computer program instructions that, when executed by the processor, cause the apparatus to carry out the steps of:
   decrementing, by the kernel on the first node, the counter by an amount equal to the size of acknowledgment data received from the second node; and
   notifying, by the kernel on the first node, a user-level application that the acknowledgment data has been received by the first node when the counter is equal to zero.

4. The apparatus of claim 3 wherein notifying a user-level application that the acknowledgment data has been received by the first node when the counter is equal to zero includes raising an interrupt in the user-level application.

5. The apparatus of claim 3 wherein notifying a user-level application that the acknowledgment data has been received by the first node when the counter is equal to zero includes being polled by the user-level application.

6. The apparatus of claim 1 further comprising computer program instructions that, when executed by the processor, cause the apparatus to carry out the step of sending an error message indicating that the send work request cannot be serviced.

7. A computer program product for messaging in a parallel computer using remote direct memory access ('RDMA'), the computer program product disposed upon a computer readable storage medium, the computer program product comprising computer program instructions that, when executed, cause a computer to carry out the steps of:

receiving, by a kernel of the first node through an application programming interface ('API'), a send work request, the send work request including: a local virtual address on the first node from which data is to be transferred; and a specification of a size of data to be transferred from the first node to a second node, wherein the size of data to be transferred from the first node to a second node is larger than a messaging packet size for sending data from the first node to a second node;

responsive to the send work request:

translating, by the kernel of the first node, the local virtual address on the first node from which data is to be transferred to a physical address on the first node from which data is to be transferred from;

creating, by the kernel of the first node, a local RDMA object that includes a counter set to the size of a messaging acknowledgment field;

sending, from a messaging unit in the first node to a messaging unit in a second node, a message that includes a RDMA read operation request, the physical address of the local RDMA object, and the physical address on the first node from which data is to be transferred from; and receiving, by the first node responsive to the second node's execution of the RDMA read operation request, acknowledgment data in the local RDMA object.

8. The computer program product of claim 7 further comprising computer program instructions that, when executed, cause a computer to carry out the steps of:

populating, by a kernel on the second node, receive work requests;

receiving, by the messaging unit in the second node, the message;

creating, by the kernel of the second node, a local RDMA object that includes a counter set to the size of the amount of data to be transferred from the first node to the second node;

transferring, by one or more RDMA operations executing on the messaging unit in the second node, the data to be transferred from the first node to the second node; and transferring, by one or more RDMA operations executing on the messaging unit in the second node, acknowledgment data from the second node to the first node.

9. The computer program product of claim 7 further comprising computer program instructions that, when executed, cause a computer to carry out the steps of:

decrementing, by the kernel on the first node, the counter by an amount equal to the size of acknowledgment data received from the second node; and notifying, by the kernel on the first node, a user-level application that the acknowledgment data has been received by the first node when the counter is equal to zero.

10. The computer program product of claim 9 wherein notifying a user-level application that the acknowledgment data has been received by the first node when the counter is equal to zero includes raising an interrupt in the user-level application.

11. The computer program product of claim 9 wherein notifying a user-level application that the acknowledgment data has been received by the first node when the counter is equal to zero includes being polled by the user-level application.

12. The computer program product of claim 7 further comprising computer program instructions that, when executed, cause a computer to carry out the step of sending an error message indicating that the send work request cannot be serviced.

* * * * *